United States Patent [19]

Naaktgeboren et al.

[11] Patent Number: 4,751,810
[45] Date of Patent: Jun. 21, 1988

[54] BALER FEEDER MECHANISM

[75] Inventors: Adrianus Naaktgeboren, Zedelgem, Belgium; Robert R. Todd, Leola, Pa.

[73] Assignee: New Holland, Inc., New Holland, Pa.

[21] Appl. No.: 21,082

[22] Filed: Mar. 3, 1987

[30] Foreign Application Priority Data

Mar. 10, 1986 [EP] European Pat. Off. ........ 86200373.8

[51] Int. Cl.⁴ ............................................. A01D 39/00
[52] U.S. Cl. ..................................... 56/341; 100/189; 100/142
[58] Field of Search .................. 56/341, 344; 100/189, 100/142

[56] References Cited

U.S. PATENT DOCUMENTS

| 4,132,164 | 1/1979 | White | 100/189 |
| 4,275,550 | 6/1981 | Swenson et al. | 56/341 |
| 4,294,346 | 10/1981 | Decoene et al. | 56/341 |
| 4,409,891 | 10/1983 | Naaktgeboren | 100/189 |
| 4,525,991 | 7/1985 | Naaktgeboren | 56/341 |
| 4,569,282 | 2/1986 | Gaiant | 56/341 |
| 4,644,862 | 2/1987 | Young | 56/341 |

FOREIGN PATENT DOCUMENTS

| 264893 | 9/1968 | Austria | 56/344 |
| 221909 | 5/1985 | Fed. Rep. of Germany | 56/341 |
| 3,426,156 | 1/1986 | Fed. Rep. of Germany | 56/344 |
| 120780 | 10/1984 | France | 56/341 |
| 2544164 | 10/1984 | France . | |
| 2082499 | 1/1984 | United Kingdom . | |

Primary Examiner—Paul J. Hirsch
Assistant Examiner—Vincent Ciamacco
Attorney, Agent, or Firm—Darrell F. Marquette; Frank A. Seemar; Larry W. Miller

[57] ABSTRACT

An agricultural baler comprises a bale case having an inlet opening for charges of crop material to be transferred thereto from a feeder duct, a plunger reciprocable within the bale case to compress successive charges of crop material from the feeder duct to form a bale, and a feeder mechanism mounted within the duct to accumulate a charge of crop material therein and then stuff that charge into the bale case. The feeder mechanism comprises a first rotatable tine bar having mounted thereon a first set of packer tines and a set of stuffer tines angularly offset from the first set of packer tines, and a second rotatable tine bar on which is mounted at least a second set of packer tines.

21 Claims, 8 Drawing Sheets

BALER FEEDER MECHANISM

BACKGROUND OF THE INVENTION

This invention relates to agricultural balers and more specifically to balers of the traditional rectangular type, i.e., balers which produce bales of crop material which are rectangular in side view.

In U.S. Pat. No. 4,525,991 there is disclosed a baler of basically conventional design in that it comprises a bale case or chamber in which a bale of crop material is formed, having an inlet opening communicating with a feeder duct in which charges of crop material are accumulated which subsequently are transferred or stuffed in the bale case for compression by a reciprocable plunger operating within the bale case. In this particular baler, the packing of crop matreial into the feeder duct to form a charge is effected by packer tines extending along a tine bar rotatable within the feeder duct, and the stuffing of an accumulated charge into the bale case is accomplished by stuffer tines mounted on the tine bar and offset from the packer times such that the outer ends of the respective sets of tines follow different paths which are preferably generally apple-shaped.

This feeding and stuffing arrangement has been found generally satisfactory except that with certain crops and crop conditions the feeding operation is less than satisfactory whereby the overall baler capacity is reduced accordingly and the top filling of the bale case is sometimes insufficient so that bales of irregular density are produced. The reason for this is that, if silage or a very wet crop, for example, is being handled, it is to some extent compressed by the packer tines as it is fed thereby into the feeder duct and a given charge tends not to recover from the compression in contrast to dry hay or straw, for example, which springs back on being released after compression and this nature resilience means that the hay or straw engages the adjacent walls of the feeder duct and thus maintains its position in the duct. However, with silage and other crops which does not have this natural resilience, there is a tendency for a given charge to fall under gravity once presented to the feeder duct by the packer tines. The greater the time lag between successive packer tine entering the feeder duct, the further a charge is likely to fall.

This problem is aggravated in larger balers which are becoming increasingly popular

SUMMARY OF THE INVENTION

According to the present invention there is provided an agricultural baler comprising a bale case having an inlet opening formed therein; a feeder duct communicating with the bale case through the inlet opening for charges of crop material to be transferred from the feeder duct into the bale case; a plunger reciprocable within the bale case to compress successive charges of crop material received from the feeder duct to form a bale; and feeder means operable within the feeder duct to accumulate a charge of crop material therein and then stuff that accumulated charge into the bale case. The feeder means comprises a first rotatable tine bar rotatable about an offset axis and having mounted thereon a first set of packer tines and a set of stuffer tines angularly offset from the first set. The first set of packer tines have outer ends following, during operation, a first path of movement and the set of stuffer tines have outer ends following, during operation, a second path of movement which is offset relative to the first path of movement.

The feeder means further comprises a second rotatable tine bar offset relative to said axis and rotatable therearound and on which is mounted at least one further set of packer tines operable to assist in accumulating a charge of crop material in the feeder duct. The second tine bar may be provided with a third set of packer tines which are preferably offset by 180° from the second set. With this arrangement, there are three main packing strockes effected in succession by the first, second and third sets of packer tines, followed by a fourth packing stroke by the stuffing tines in as much as packing is carried out by these tines prior to the stuffing action which actually transfer the accumulated charge from the feeder duct to the bale case.

DESCRIPTION OF THE DRAWINGS

An agricultural baler in accordance with the present invention will now be described in greater detail, by way of example, with reference to the accompanying drawings in which.

DESCRIPTION OF THE PREFERRED EMBODIMENT

Figure 1:
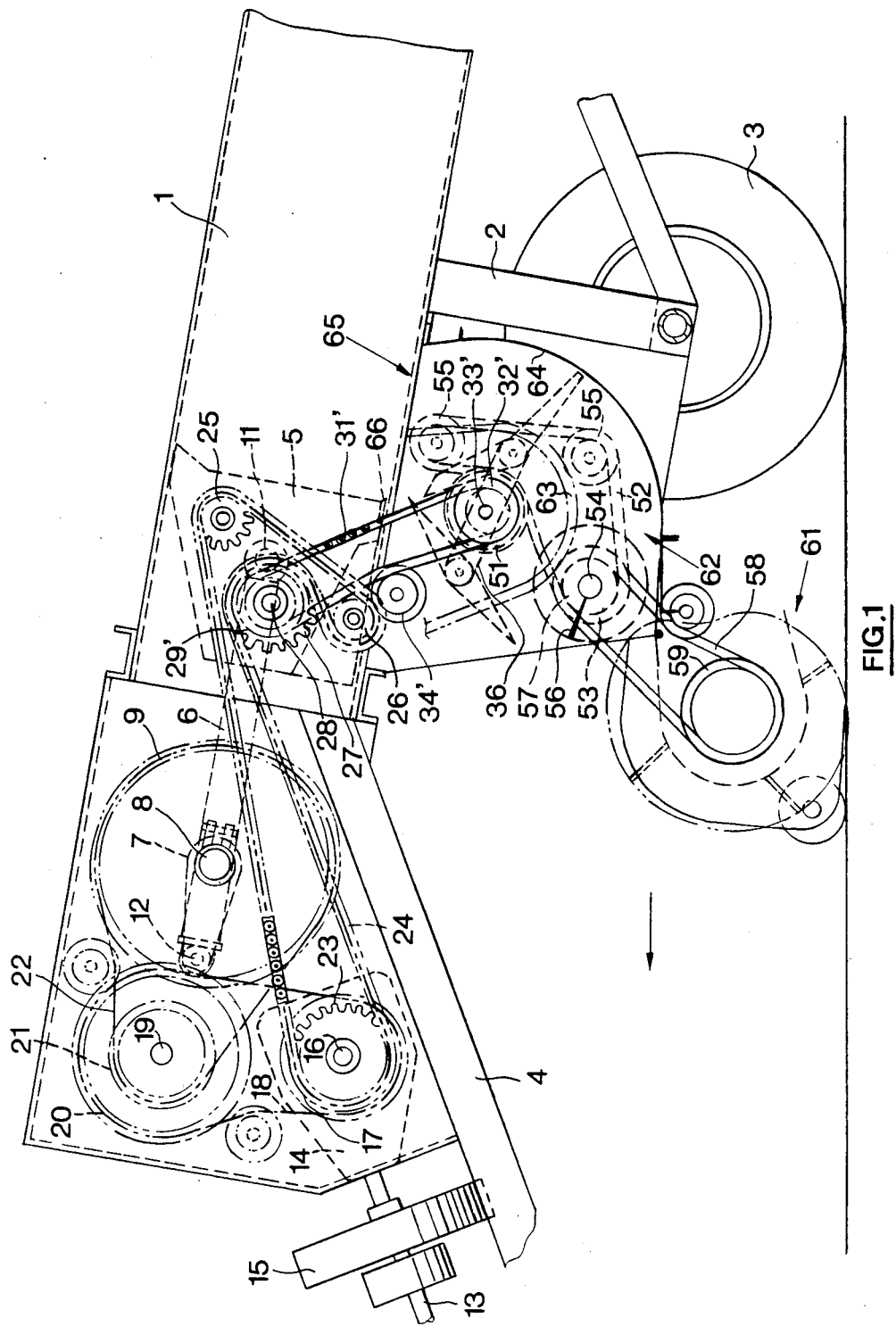
FIG. 1 is a side view of the baler.
Figure 2:
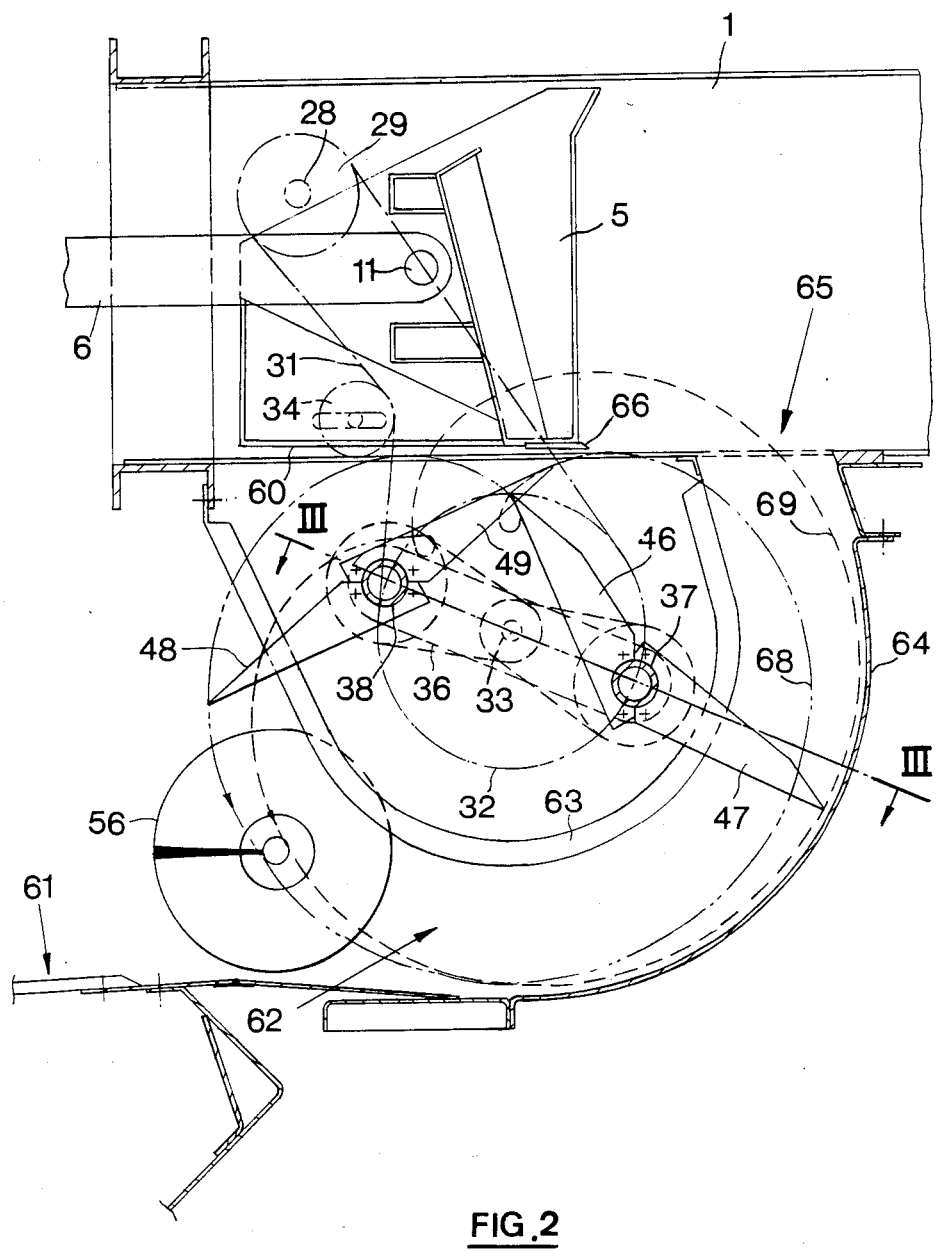
FIG. 2 is an enlarged detail of FIG. 1, partly in section.
Figure 3:
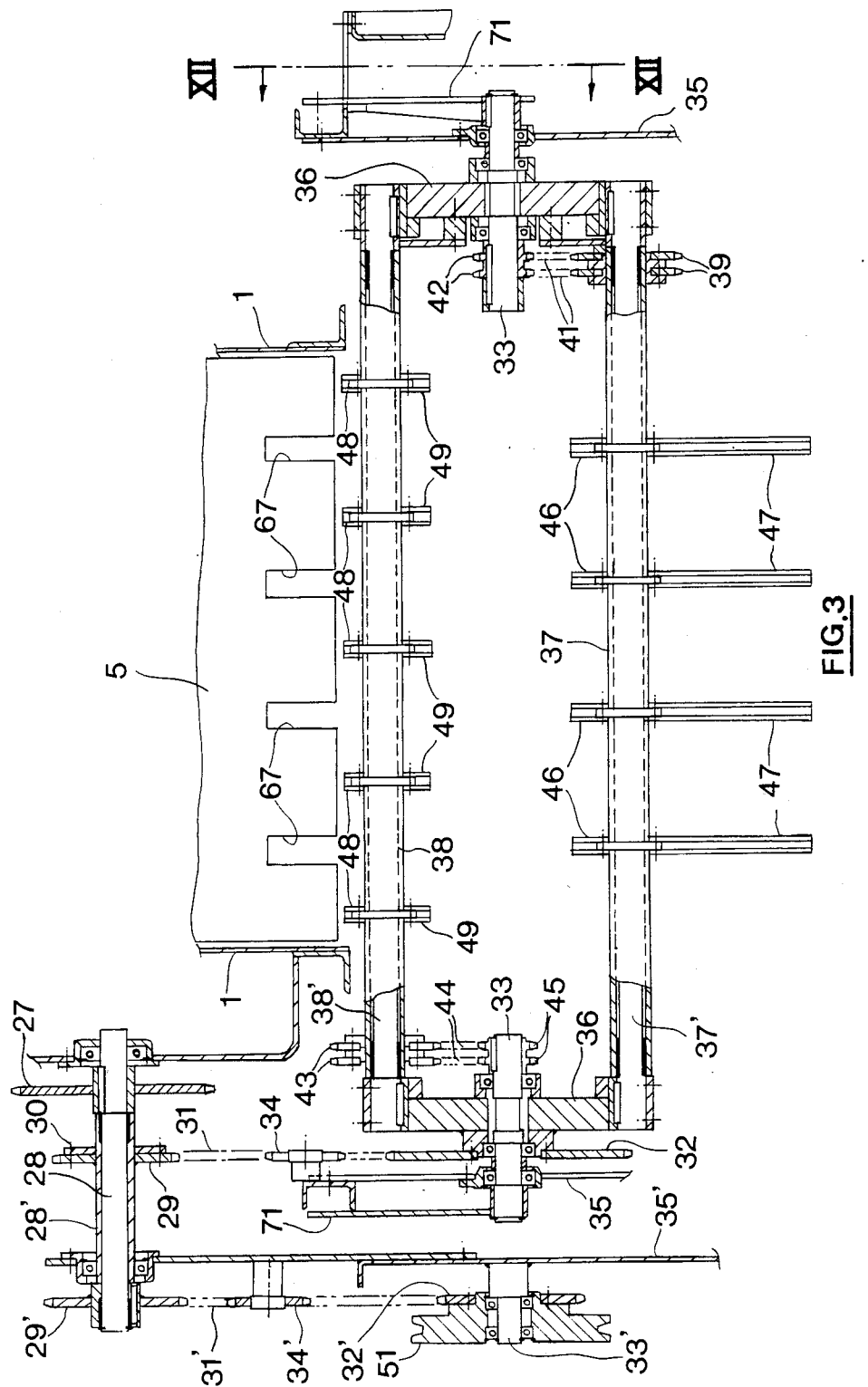
FIG. 3 is a sectional view on the line III—III of FIG. 2.

Referring to FIGS. 1 to 3 of the drawings, the baler comprises a bale case or chamber 1 mounted on a frame 2 which is supported by wheels 3. A tongue or draw bar 4 extends forwardly from the bale case 1 for attachment to a tractor or other vehicle used for towing the baler, this vehicle not being shown. A plunger 5 is mounted for reciprocation within the bale case 1 and is attached by a connecting rod 6 to a crank arm 7 attached to a crank shaft 8 which also carries a sprocket 9. The connecting rod 6 is pivotally attached to the plunger at 11 and pivotally attached at its other end to the crank arm 7 at 12. A drive shaft 13 is adapted for connection to the power takeoff (PTO) of the tractor or other vehicle and is also connected to a gearbox 14 on the baler via a flywheel 15.

The gearbox 14 has an output shaft 16 which carries sprocket 17 around which a chain 18 passes to a sprocket 20 of larger diameter on an intermediate shaft 19, this shaft also carrying a smaller diameter sprocket 21 attached by a chain 22 to the sprocket 9 on the crank sahft 8. This conventional arrangement effects a speed reduction for the rotation of the sprocket 9 from the gearbox 14, rotation of the sprocket 9 serving to reciprocate the plunger 5 within the bale case 1 by virtue of the crank 7.

The output shaft 16 of the gearbox 14 also carries a sprocket 23 around which passes a chain 24 which also extends around idler sprockets 25 and 26 and a drive sprocket 27 carried by a further intermediate shaft 28. The shaft 28 carries a further sprocket 29 to transverse tine bar supports 37' and 38'. The arms 36 together with the tine bar supports 37' and 38' thus form a rigid rectangular frame which is rotatable about the centrally disposed stub shafts 33 as can be best seen in FIG. 3. Tine bars 37 and 38 are rotatably mounted on the respective tine bar supports 37' and 38' and to this end are in the form of tubes slided over said supports 37' and 38'. The tine bar 37 carries two sprockets 39 which are attached by chains 41 to respective ones of a pair of further sprockets 42 keyed to the associated stub shaft 33. Similarly, the tine bar 38 carries a pair of sprockets 43 connected by chains 44 to sprockets 45 keyed to the stub shaft 33 at the other side of the baler.

The tine bar 37 carries two sets of tines in the form of a first set of packet tines 46 and a set of stuffer tines 47, these sets of tines being angularly offset with respect to each other preferably by an angle of 157.5°. The stuffer tines 47 are longer than the packer tines 46 and the arrangement in this respect is generally similar to that disclosed in U.S. Pat. No. 4,525,991, incorporated herein by reference.

The tine bar 38 carries a second and third set of packer tines 48 and 49 which are offset from one another by 180° and have a length equal to that of the first set of packer tines 46.

Returning to FIGS. 1 and 3 of the drawings, a further sprocket 29' is mounted on the bushing 28' also carrying the sprocket 29 for rotation in unison therewith. A chain 31' extends around the sprocket 29' and further also around a sprocket 32' rotatably mounted on a stub-shaft 33' which itself is fixedly mounted on a frame member 35' co-axially with the stub shafts 33. A pulley 51 is fixedly connected to the sprocket 32' for rotation in unison therewith around the stub shaft 33'. This pulley 51 drives a belt 52 which further also extends around the pulley 53 on a shaft 54 and around idler pulleys 55. This belt transmission with components 51 to 55 is operable to drive a first stub auger 56 mounted on the sahft 54 and provided in offset relationship with the feeder duct inlet throat and at the left hand side thereof where seen in the direction of operative movement of the baler.

The shaft 54 carries a further pulley 57 around which a belt 58 extends to a further pulley 59 on a crop pick-up drive 61. A further belt transmission (not shown) similar to the belt transmission between the first stub auger 56 and the pick-up device 61 extends at the other side of the pick-up device 61 between the latter and a further stub auger 56 provided in offset relationship with the feeder duct inlet throat and at the right hand side thereof.

In operation of the machine, crop material is picked up from the ground by the pick-up device 61 which feeds it directly to the feeder inlet throat, respectively to the stub augers 56 which then consolidate the crop material centrally of the baler for transfer into the inlet throat of the feeder duct 62 defined by opposite side walls, a front wall 63 and rear wall 64 and terminating in an inlet opening 65 in the bottom wall of the bale case 1.

As the feeder mechanism operates, the sets of tines 46,47,48 and 49 are rotated in a counterclockwise direction (as viewed in FIG. 2) about the axis extending through the stub shafts 33 by virtue of the rectangular frame, formed by the arms 36 and the tine bar supports 37' and 38', being rotated in said direction via the chain transmission 29,31 and 32. Simultaneously, the sets of tines 46,47 48, and 49 also are rotated, as viewed in FIG. 2, in a clockwise direction about the respective tine bar supports 37' and 38' by virtue of the chain transmissions 39, 41 and 42 respectively 43,44 and 45. This causes the outer ends of the tines 46, 48 and 49 to follow a path of movement designated 69. These paths of movement 68,69 are offset relative to each other with the path 69 penetrating deeper into the feeder duct 62 than the path 68. The paths of movement 68,69 are generally apple-shaped because the sprockets 39 and 43 driving the tines 46,47,48 and 49 or bit about the stationary sprockets 42, respectively 45 by virtue of the chain 41, respectively 44 and have twice as many teeth as the stationary sprockets 42 and 45. For two complete revolutions of the rectangular frame 36, 37' 38' in the counterclockwise direction as viewed in FIG. 2, i.e., 720° of rotation, the sprockets 39 and 43 with the tine bars 37 and 38 make one complete revolution, i.e., 360° of rotation, in the clockwise direction relative to the tine bar supports 37' and 38'.

Turning now to FIGS. 4 to 11, the sequence of operation of the machine will now be described with respect to the accumulation of charges of material in the feeder duct 62, and the transfer of an overall accumulator charge from the feeder duct 62 into the bale cae 1.

Figure 4:
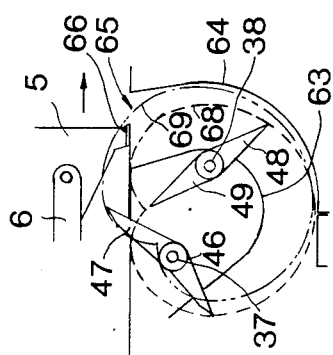

In FIG. 4 the stuffer tines 47 have just completed the stuffer stroke, i.e., the stuffer tines 47 have transferred a charge of crop material from the feeder duct 62 into the bale case 1. The packer tines 48 on the tine bar 38 have just entered the feeder duct 62 bringing with them a first charge of material. The plunger 5 is moving on its compression stroke and is seen to be about midway across the bale case entrance 65 or transition between the feeder duct 62 and the bale case 1. The conventional knife 66 on the plunger 5 is thus beginning to cut the stuffed charge of material in the bale case 1 from any material in the feeder duct 62.

Figure 5:
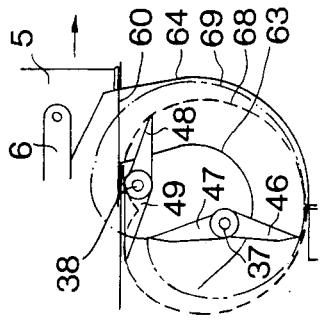

In FIG. 5 the packer tines 48 are completing their packing stroke and the plunger 5 is continuing to compress the last loaded charge of material into the bale being formed. In this position of the plunger 5 in FIG. 5, the inlet opening 65 between the feeder duct 62 and the bale case 1 is closed by an extension 60 of the plunger and thus the packer tines 48 precompress the first charge of crop material in the feeder duct 62 and against the extension 60 of the plunger 5. As the packer tines 48 finish their packing stroke, the set of packer tines 46 on the other tine bar 37 begin their packing stroke so as to bring a second charge of crop material into the feeder duct 62. This second charge is added to the first charge already in the feeder duct 62 and is equally precompressed therein with the plunger extension acting as a backstop.

Figure 6:
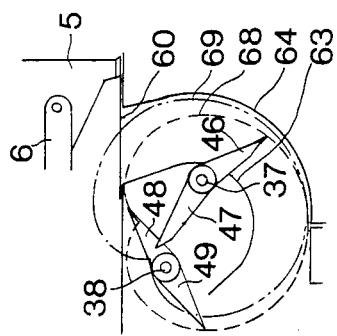

In FIG. 6, the packer tines 46 have entered further into the feeder duct 62 and the plunger 5 is reaching its maximum compression position. It will be noted that the next set of packer tines 49 on the tine bar 38 are being positioned for their operative movement.

Figure 7:
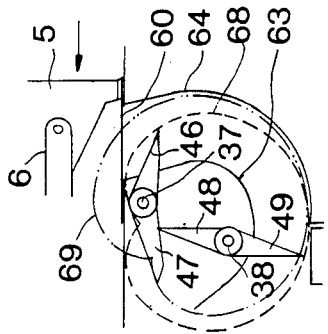
FIGS. 4 to 11 are explanatory diagrams helpful in explaining the operation of the baler of FIGS. 1 to 3.

Moving to FIG. 7, the packer tines 46 are completing their packing stroke and the next set of packing tines 49 is beginning its stroke and thus bringing a third charge of crop material into the feeder duct 62 and adding said third charge in a precompressed condition to the first and second charges already in the feeder duct 62. The plunger 5 is now beginning its return stroke. Moving to FIG. 8, the set of packer tines 49 is proceeding into the feeder duct 62 and the stuffer tines 47 are in position ready to begin their working stroke. The plunger 5 is continuing to execute its return stroke and is already beginning to clear the inlet opening 65 in the bale case lower wall. It is noted that at this point in the cycle, the plunger 5 has completed about half a cycle or 180° while that the rectangular feeder frame formed by the arms 36 and the supports 37',38' has already completed a full revolution or 360°. So far, during the first half of a complete feeder cycle (i.e., 720° of the rectangular frame 36, 37', 38'), only one set of tines of each tine bar, namely the packer tines 46 of the tine bar 37 and the packer tines 48 of the tine bar 38, have swept across the full length of the feeder duct 62; the other packer tines 49 of the tine bar 38 and the stuffer tines 47 of the tine bar 37 becoming operative only during the second half of the feeder cycle, i.e., during the second full revolution of the rectangular frame 36, 37', 38'.

Figure 11:
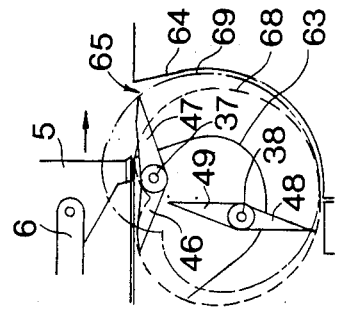
Figure 10:
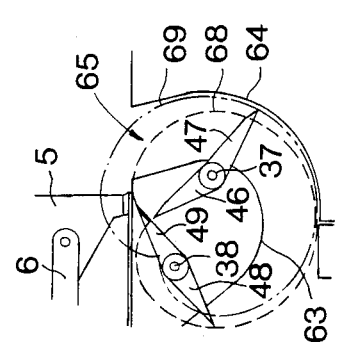
Figure 9:
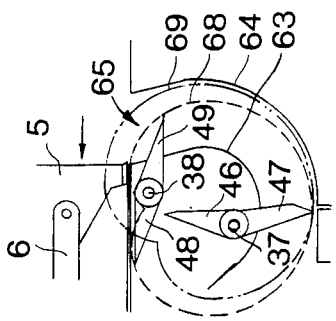
Figure 8:
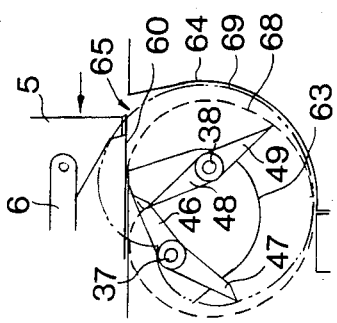

In FIG. 9, the packer tines 49 are finishing their packing stroke and the stuffer tines 47 are beginning their stroke and thus bringing a fourth and final charge of crop material into the feeder duct 62 and acting at this stage as packer tines. It should be noted that at this point the plunger 5 has now cleared the inlet opening 65 into the bale case 1 so that the packer tines 49 in fact effect some stuffing of the already loaded crop material into the bale chamber. In FIG. 10 the stuffer tines 47 have proceeded into the feeder duct 62 and the set of packer tines 48 is ready to commence the next cycle of operation. It is noted here that the stuffer tines 47 sweep with their outer ends closely along the rear wall 64 of the feeder duct 62 for taking the entire accumulated charge (i.e., a charge composed of four smaller charges each of which has been fed into the feeder duct 62 by another set of packer tines, respectively the stuffer tines) to the bale case 1 through the inlet opening 65. The packer tines 46,48 and 49 penetrate to a lesser degree into the feeder duct 62. The plunger 5 is approaching its fully retracted position. Finally, FIG. 11 shows the stuffer tines 47 enter the bale case 1, then the previously loaded four charges of material are stuffed into the bale case in front of the plunger which is now just commencing its working or compression stroke. In as much as the stuffer tines 47 have to enter the bale case 1, then they must be able o pass the plunger 5 and this is allowed by the provision of slots 67 in the plunger front and base, which slots also accommodate the needles (not shown) for twine wrapping of a formed bale, this being the conventional arrangement.

When the stuffer tines 47 are moving through the bale case 1 in a generally forward direction, the plunger 5 has already commenced its next compression stroke and thus is moving generally in the opposite direction when compared with the generally forwardly directed movement of the stuffer tines. This enables that the plunger 5 smoothly takes over the charge of crop material from the stuffer tines 47 and "wipes" said stuffer tines 47 clean.

In FIG. 11, the set of packer tines 48 are now bringing in the first charge of material for the next cycle of operation.

It will be noted particularly from FIG. 6 that the two sets of tines 46,47 and 48,49 on the tine bars 37 and 38 overlap each other and are thus staggered with respect to each other and are thus staggerd with respect to each other so that they interleave as they rotate. It should also be noted that all of the packer tines 46,48 and 49 execute an identical apple-shaped path 68 (FIG. 2) by their respective outer tips and that the stuffer tines 47 execute a separate, but similarly shaped path 69, this path actually entering the bale chamber as previously described. It should be noted further that the packer tines 46, 48 and 49 may be arranged to execute different paths which are spaced closer to or further from the rear wall 64 of the feeder duct 62 as desired. The basic requirement is that the stuffer path 69 is different from the packer path 68 although there may be a plurality of the latter. More specifically, the stuffer tines 47 should penetrate deeper into the feeder duct 62 than any of the packer tines 46,48 and 49 in as much as these stuffer tines 47 should sweep closely across the rear wall 64 of the feeder duct 62 to take with it, during its operative movement, all the material previously accumulated in the feeder duct 62. Similarly, a set of packer tines which becomes operative before another set of packer tines may penetrate deeper into the feeder duct 62, i.e., have the ends thereof moving closer to the rear wall 64 of the feeder duct 62 than the ends of said another set of packer tines in as much as said another set of packer tines should add a further charge to the crop material already held in the feeder duct 62.

A final point to be made is that the apple-shaped packer path 68 lies wholly within the feeder duct 62 and does not enter the bale chamber (1) although as mentioned there is some stuffing effect of the packer tines 49 as they pass close to the bale case inlet opening 65 in as much as the latter is open at that point in the operating cycle. The paths 68,69 can be varied either by varying the length of the tines 46, 47, 48, 49 and/or the angle between sets of tines on a given tine bar and/or the angular timing between the tine bars 37, 38 and the stationary stub shafts 33 and/or the angular position of said stub shafts 33. In the embodiment of FIGS. 1 to 3, the angular position of the tine paths 68,69 is made adjustable by means of respective handles 71 secured to the stub shafts 33 and which, during operation, are held in fixed positions relative to the frame. Angular adjustment of the handles 71 varies the angular positions of the stub shafts 33 and thus also of the sprockets 42 and 45 which drive the sprockets 43 and 39 and hence the tine bars 37 and 38.

Returning to FIG. 3, the tine paths 68,69 are dictated by the ratio of the sprockets 43,45 and 39,42 this ratio being 2:1 in the illustration embodiment as already explained. If for example, the ratio were 1:1 then the tines 46,47,48 and 49 would remain in a fixed orientation during operation.

It will be appreciated that for the rectangular feeder frame 36, 37', 38', 36 to complete a 720° cycle (i.e., two full revolutions) while that the plunger 5 completes only a 360° cycle as already explained, the transmission ratio between the gearbox 14 and the crank shaft 8 on the one hand and the gearbox 14 and the sprocket 32 associated with the feeder frame 36, 37', 38', 36 is rotated, the chains 41 and 44 engaging the fixed sprockets 42 and 45, respectively, cause the sprockets 39 and 43 to rotate at half the rate, whereby the tine bars 37 and 38 are rotated, again at half the rate but in the opposite direction relative to the tine bar supports 37' and 38', again as already explained. The resultant movement of the tine bars 37 and 38 thus is a combined movement along the apple-shaped paths 68,69 at half the rate relative to the movement of the rectangular feeder frame 36, 37', 38' and 36 and in the direction of rotation of said frame. Thus the ratio between the plunger and each of the sets of tines 46, 47, 48, 49 is 1:1, or, in other words, each of the sets of tines 46, 47, 48, 49 becomes operative once during a full cycle of the plunger.

Figure 12:
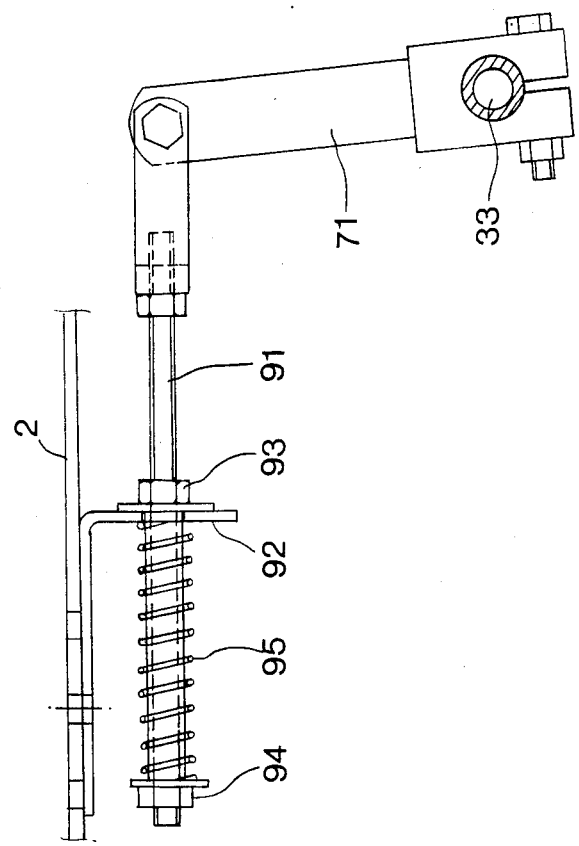
FIG. 12 is an enlarged detail view showing aspects of a second embodiment and taken in the direction of arrows XII—XII as shown in FIG. 3.

Turning now to FIG. 12 showing an alternative embodiment of the invention which is derived from the embodiment shown in FIGS. 1-3, it will be seen that, while in the embodiment of FIGS. 1-3 the sprockets 42 are truly stationary during operation by virtue of the associated arm 71 being fixedly connected to the frame, this alternative embodiment resiliently holds the sprockets 42 in place during operation. To this end, the arm 71 associated with the tine bar 37 is pivotally coupled at its free end to a rod 91 which is disposed to extend through an aperture in a support 92 on the frame 2. A pair of stops 93,94 are adjustably provided on the rod 91 on opposite sides of the support 92. The stop 93 is disposed to abut the support 92 while that a coil spring 95 is arranged coaxially with the rod 91 between the support 92 and the other stop 94. The stub shaft 33 associated with the tine bar 37 is thus still a generally stationary shaft when ignoring the rather limited angular displacement of the same permitted by the spring arrangement just described.

This arrangement permits a slight shifting of the tine path 68 of the packer tines 46, respectively the tine path 69 of the stuffer tines 47 when these tines meet excessive loads by virtue of the associated "stationary" sprockets 42 being rotatable over a small angle thus compressing the coil spring 95 accordingly and whereby the peak loads on the feeder mechanism are topped off to some extent. While, in principle it is possible to combine the same resilient means also with the other tine bar 38, there are good reasons for preferably combining said resilient means only with the tine bar 37.

One such reason is to be seen in the fact tht, upon angular displacement of the tine path 68 of the tine bar 38, said path may penetrate into the bale case 1 and interfere with the plunger movement unless further slots 67 would be provided in said plunger 5 in alignment with the packer tines 48,49. Angular displacement of the tine paths 68,69 of the packer tines 46, respectively the stuffer tines 47 on the other hand would not interfere with the plunger movement even when said paths penetrate, respectively penetrate further into the bale case 1 as the slots 67 provided in the plunger 5 are aligned with said paths 68,69.

However, more importantly, the packer tines 48 of the tine bar 38 are not likely to encounter any excessive loads as they are operable to feed the first charge of crop material into the feeder duct 62. In other words, when the packer tines 48 move through their operative stroke only a small amount of crop material is present in the feeder duct 62 and thus a minimal resistance to compaction of said crop material is experienced. The packer tines 49 of the same tine bar 38 on the other hand equally are not likely to meet excessive loads even though they are operable to feed a third charge into the feeder duct 62 in addition to two other charges already fed therein. The reason therefore is that, when these packer 49 move through their operative stroke, the plunger 5 is already beginning to clear the bale case inlet 65 so that stuffing may start and thus less counterpressure will be experienced, which otherwise originates from the packer tines packing crop material against the backstop formed by the plunger extension 60.

In contrast therewith, counterpressure may be high when the packer tines 46 of the tine bar, 37 pack the first and second charges in the feeder duct 62 against the plunger extension 60 which, when said packer tines 46 are operative, obstruct the bale case inlet 65 completely so that a eventual excessive amount of crop material has no chance to escape from the packing action of the packer tines 46.

Similarly, the back pressure met by the stuffer tines 47 may be high even though the bale case inlet 65 is fully exposed when said stuffer tines 47 becomes operative; the reason therefore being this time that the four charges previously gathered in the feeder duct together may form an excessively large accumulator charge or wad.

In both these conditions where the tine bar 37 meets excessive counterpressure, the packer tines 46, respectively the stuffer tines 47 are allowed to resiliently turn aside to some extent thereby topping all the peak loads as already said.

Figure 13:
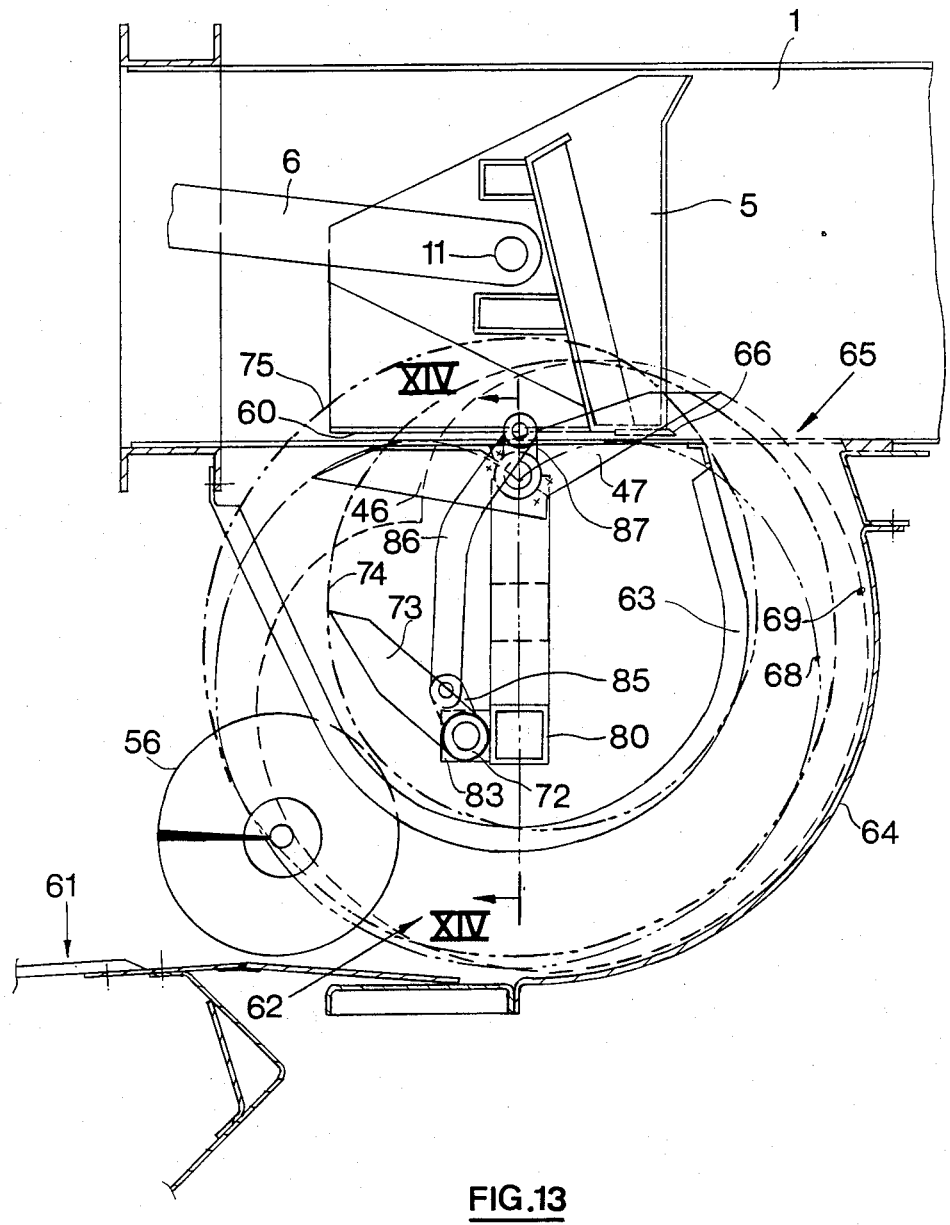
FIG. 13 is a view similar to that of FIG. 2 but of a third embdiment.
Figure 14:
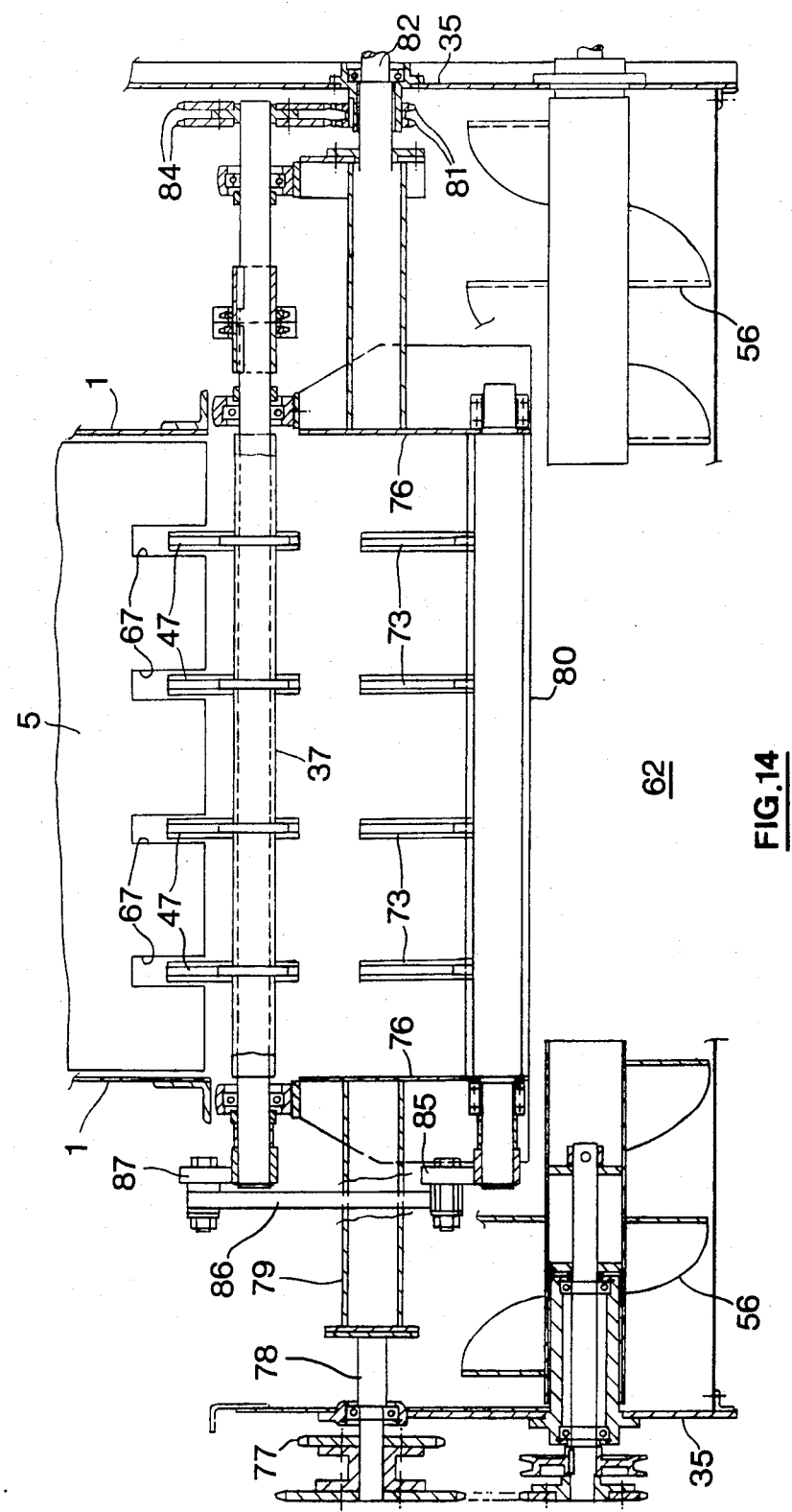
FIG. 14 is a sectional view on the line XIV—XIV of FIG. 13.

Turning now to FIGS. 13 and 14, these show a further alternative embodiment in which the one tine bar is identical to the tine bar 37 of the first embodiment carrying the packer tines 46 and the stuffer tines 47. These and other similar components have been given the same reference numerals. However, the difference is that the second tine bar 72 carries only one set of tines 73 and is linked to the first tine bar 37 in a particular manner as will be described. Basically, this single set of tines 73 is reciprocated by being linked with the first tine bar 37 but in as much as the whole mounting of the second tine bar 72 is also rotated, then a relatively complex path is followed by the tips of the single set of tines 73. In fact, this path is effectively composed of two nearly circular halves 74 and 75 (although not true circles), the first half 74 being executed within the body of the feeder duct 62 (i.e., not penetrating or nearly not penetrating into the feeder duct 62) and the second half 75 being larger and bringing the tines 73 into the working position and therefore following more closely the rear wall 64 of the feeder duct 62. These two nearly circular paths 74,75 when viewed overall, give a general apple shape as seen in FIGS. 13 and 15 to 22.

Basically this alternative arrangement is derived from the baler feeder mechanism disclosed in U.S. Pat. No. 4,525,991, in that it also comprises a tine bar 37 with a single set of packer tines 46 and a single set of stuffer tines 47 and which is rotatably mounted at one end of arms 76 and as such, together with a counterbalancing transverse beam 80 fixedly interconnecting the other ends of the arms 76, forms a rectangular frame. Reference is made to U.S. Pat. No. 4,525,991 for more details of this structure.

This frame is rotated by a sprocket 77 which has a similar function as the sprocket 32 of the first embodiment except that, in this second embodiment, it is fixed to a shaft 78 which in turn is fixed to a tube 79 which, again in turn, is fixedly coupled to one arm 76 of the rectangular frame generally at the center thereof. This tube 79 is thus rotated by the sprocket and carries with it the rectangular frame to which it is attached. The tine bar 37 is rotated in an opposite direction in a manner identical to that of the first embodiment in as much as there are a stationary pair of sprockets 81 which are mounted co-axially on a stub shaft 82 but fixed to the side wall 35 of the machine in order to mount them non-rotationally. The stub shaft 82 is aligned with the shaft 79 and the tube 79 and is fixedly connected to the other arm 76 of the rectangular frame again at the center thereof. Chains passing around the sprockets 81 drive sprockets 84 attached to the tine bar 37 and thus effects the rotation thereof, again in a ratio 2:1 as in the first embodiment, in as much as the sprockets 84 have twice as many teeth as the sprockets 81.

The second tine bar 72 has to be driven in a different manner as follows. The tine bar 72 itself is pivotally mounted to one side of the counterbalancing transverse beam 80 via mounting brackets 83 provided thereon and has attached to it at one end a crank arm 85 which is connected to one end of an arm 86 which is connected at its other end to a further crank arm 87 which in turn is attached at its other end to the tine bar 37. Thus, the arm 86 simply links the two tine bars 37,72 together via respective crank arms 85 and 87 which are of different lengths. The shorter crank is the one 87 on the tine bar 37 which is rotated with that tine bar 37, whereby the longer crank arm 85 on the tine bar 72 causes that tine bar 72 to rock or oscillate relative to its mounting brackets 83 by the connection between the two cranks 85,87 via the arm 86. Thus, the basic movement of the tines 73 on the tine bar 72 is one of reciprocation only but this is varied by the fact that the tine bar 72 itself is also rotating. This is why the tips of the tines 73 execute the two nearly circular paths 74 and 75 to make up the overall apple path as already mentioned.

Figure 15:
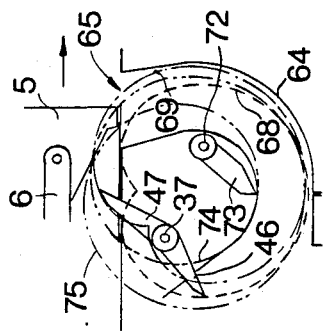
FIGS. 15 to 22 are explanatory diagrams similar to those of FIGS. 4 to 11 but in respect of the third embodiment.
Figure 16:
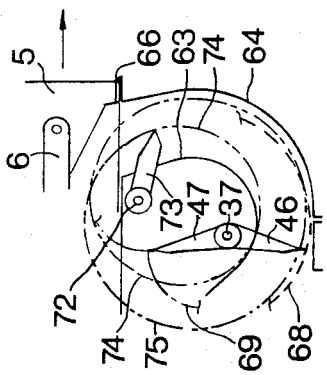
Figure 17:
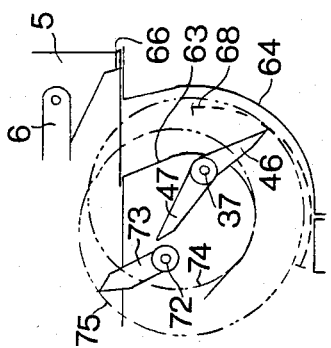
Figure 18:
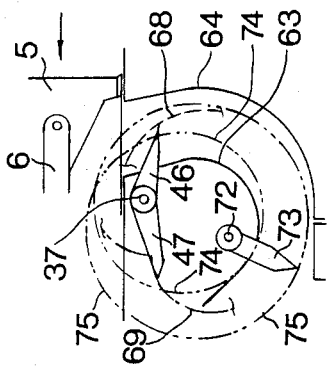
Figure 19:
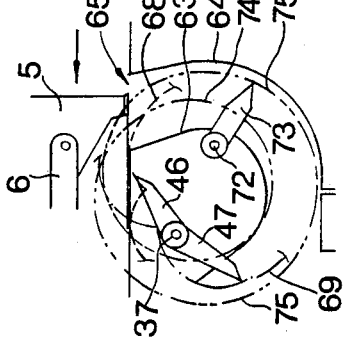
Figure 20:
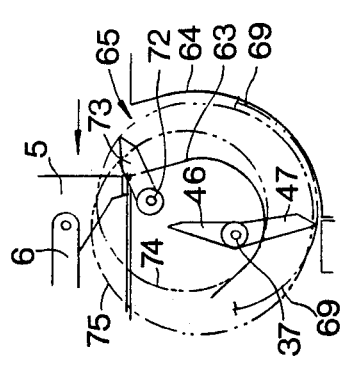
Figure 21:
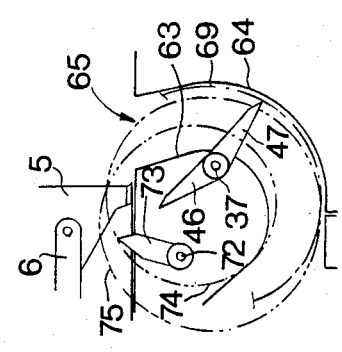
Figure 22:
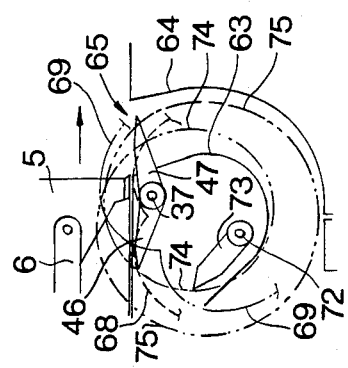

Referring to FIGS. 15 to 22, the overall sequence of operation is generally similar to that illustrated and described with respect to FIGS. 4 to 11 except that one of the four strokes is missing. In FIG. 15 the stuffer tines 47 are shown finishing their stroke and the next stroke will be that of a packing stroke executed by the packer tines 46 on the tine bar 37 in as much as the packer tines 48 of the first embodiment are the ones which are in effect omitted from this second embodiment. The packer tines 46 thus take a charge of material into the feeder duct 62 which charge effectively is comparable to the combined first and second charges in the first embodiment and it is during this stroke that the tines 73 on the tine bar 72 are executing their "inner path" 74 of operation. When the packer tines 46 are completing their operative stroke (FIG. 18), it is then that the packer tines 73 of the tine bar 72 come into operation and execute their "outer path" 75 mode of operation, thus taking a second charge of material into the bale feeder duct 62 which is comparable to the third charge in the first embodiment taken by the third set of packer tines 49 thereof. Finally, the stuffer tines 47 of the tine bar 37 bring in a third charge of material and stuff all three charges into the bale case 1. It should be noted that as the packer tines 73 of the second tine bar 72 complete their stroke, they will in fact effect some stuffng just as the packer tines 49 did in the first embodiment. It will also be noted that, unlike their counterparts in the first embodiment, the packer tines 73 enter into the bale case 1, whereby these packer tines 73 have been aligned with the stuffer tines 47 on the tine bar 37 and with the slots 67 in the plunger 5.

In both of the illustrated embodiments it will be seen that the second tine bar 38 or 72 provides further tines 48,49 resp. 73 following closely the tines on the tine bar 37 and thus preventing previously packed crop material falling down the feeder duct 62 and accordingly diminishing the overall effectiveness and hence also the capacity of the feeder operation. The provision of two extra sts of tines 48 and 49 in the embodiment of FIGS. 1 to 3 assists further in this respect than the additional single set 73 of the embodiment of FIGS. 13 and 14 but nevertheless the latter is effective in overcoming the basic problem in that the tines 73 effect some holding or support of already loaded crop material when undergoing their "outer path" 74 of operation.

Having thus described the invention, what is claimed is:

1. In an agricultural baler including a bale case having an inlet opening formed therein; a feeder duct communicating with the bale case through the inlet opening for charges of crop material to be transferred from the feeder duct into the bale case; a plunger reciprocable within the bale case to compress successive charges of crop material received from the feeder duct to form a bale; and feeder means operable within the feeder duct to accumulate a charge of crop material therein and then stuff that accumulated charge into the bale case; the feeder means comprising a first rotatable tine bar rotatable about an offset axis and having mounted thereon a first set of packer tines and a set of stuffer tines angularly offset from the first set; the first set of packer tines having outer ends following, during operation, a first path of movement and the set of stuffer tines having outer ends following, during operation, a second path of movement which is offset relative to the first path of movement, the improvement wherein:

the feeder means further comprises a second rotatable tine bar offset relative to said axis and rotatable therearound and on which is mounted at least one further set of packer tines operable to assist in accumulating a charge of crop material in the feeder duct; and the first and second tine bars are rotatable in one direction about the offset axis and further also are rotatable in the opposite direction about their respective own axes and in that generally stationary means co-axial with the offset axis and means drivingly coupling the first and second tine bars to the generally stationary means are provided; the arrangement being such that, as the first and second tine bars are rotated about the offset axis and the generally stationary means co-axially therewith, in the one direction, the means drivingly coupling the first and second tine bars to the generally stationary means causes said first and second tine bars to rotate in the opposite direction about their respective own axes.

2. In a baler according to claim 1, wherein the second tine bar is provided diametrically opposite to the first tine bar with respect to the offset axis of rotation and at equal distance therefrom.

3. In a baler according to claim 2, wherein during their operative movement, the stuffer tines penetrate deeper into the feeder duct than the tines of any one set of packer tines.

4. In a baler according to claim 3, wherein the second tine bar is provided with two sets of packer tines.

5. In a baler according to claim 4, wherein the two sets of packer tines on the second tine bar are angularly offset from one another by 180°.

6. In a baler according to claim 1, wherein the first and the at least one further set of packer tines successively become operative inbetween two successive operative strokes of the set of stuffer tines; the arrangement being such that each set of packer tines which becomes operative before another set of packer tines penetrates deeper into the feeder duct than said another set of packer tines.

7. In a baler according to claim 1, wherein the first and the at least one further set of packer tines successively become operative inbetween two successive operative strokes of the set of stuffer tines; all sets of packer tines following the same path through the feeder duct.

8. In a baler according to claim 7, wherein all packer tines are of the same length.

9. In a baler according to claim 1 wherein the transmission ratio of the means drivingly coupling the first and second tine bars to the generally stationary means is such that for a given angular displacement of the first and second tine bars in the one direction about the offset axis, the first and second tine bars are angularly displaced in the opposite direction about their respective own axes through an angle corresponding to half the given angular displacement about the offset axis; the arrangement being such that the packer tines and stuffer tines of the first and second tine bars make resultant movements in the one direction.

10. In a baler according to claim 9, wherein the feeder means comprises a rectangular frame which in use, is rotated in said one direction about said offset axis and which includes a pair of tine bar supports provided diametrically opposite to each other and relative to said offset axis and equidistantly therefrom; the first and second tine bars being rotatably mounted on said tine bar supports.

11. In a baler according to claim 1, wherein the tines on the second tine bar are staggered transversely with respect to the tines o the first tine bar.

12. In a baler acccording to claim 1, wherein during operation the stuffer tines penetrate from the feeder duct into the bale case while the packer tines do not enter into the bale case subsequent to their operative stroke through the feeder duct.

13. In a baler according to claim 4, wherein during a feeder cycle:
first, one set of packer tines of the second tine bar is movable through the feeder duct to feed a first charge of crop material therein;
next, the one set of packer tines of the first tine bar is movable through the feeder duct to add a second charge of crop material to the first charge of crop material already contained in the feeder duct;
subsequently, the other set of packer tines of the second tine bar is movable through the feeder duct to add a third charge of crop material to the first and second charges of crop material already contained in the feeder duct; and
finally, the set of stuffer tines of the first tine bar is movable through the feeder duct initially to add a fourth and final charge of crop material to the first, second and third charges of crop material previously accumulated in the feeder duct to form an accumulated charge and ultimately to stuff the accumulated charge through the inlet opening into the bale case.

14. In a baler according to claim 13 wherein the first, second and third sets of packer tines and the set of stuffer tines also serve to precompress crop material in the feeder duct prior to stuffing an accumulated charge into the bale case.

15. In a baler according to claim 13 wherein the plunger is oscillated back-and-forth across the bale case inlet opening in timed sequence with the operation of the feeder means, wherein the plunger:
obstructs the bale case inlet opening during the operative strokes of the one set of packer tines of the second tine bar and the one set of packer tines of the first tine bar to act as a backstop for crop material accumulated in the feeder duct;
begins to clear the bale case inlet opening during the operative stroke of the other set of packer tines of the second tine bar to permit an initial stuffing action in addition to the further crop accumulating action; and
fully clears the bale case inlet opening during the operative stroke of the set of stuffer tines of the first tine bar to permit stuffing of the accumulated charge through the bale case inlet opening into the bale case.

16. In a baler according to claim 1 and further comprising a rotatable crank arm connected to the plunger for causing reciprocation thereof in the bale case and drive means coupled to the feeder means operable to rotate said feeder means in the one direction and wherein the drive means coupled to the feeder means is operable, while that the crank arm makes one complete 360° revolution, to rotate said feeder means in said one direction through two complete 360° revolutions thereby causing the sets of tines of the first and second tine bars to make one complete cycle along their respective paths in said one direction.

17. In a baler according to claim 16 wherein the generally stationary means associated with the first tine bar are angularly movably mounted on a frame member and are coupled thereto via resilient means urging said generally stationary means to one extreme angular position and permitting limited angular displacement of said generally stationary means in the opposite direction in response to the load on the sets of tines of the first tine bar.

18. In a baler according to claim 1, wherein the feeder means comprises:
a frame member which, in use, is rotated in one direction about said offset axis and which rotatably supports said first and second tine bars at opposite sides relative to said axis;
generally stationary means co-axial with the offset axis;
means drivingly coupling the first tine bar to the generally stationary means; the arrangement being such that, as the frame member is rotated in the one direction about the offset axis and the generally stationary means co-axially therewith, the means drivingly coupling the first tine bar to the generally stationary means causes said first tine bar to rotate in the opposite direction about its own axis, and
connecting means interconnecting the first and second tine bars for the first tine bar to drive the second tine bar about its own axis.

19. In a baler according to claim 18, wherein:
the second tine bar is provided with only one set of packer tines;
the connecting means comprises an arm, the ends of which are pivotally attached to the respective tine bars through crank arms of differing lengths, the shorter one being associated with the first tine bar, whereby the second tine bar is only reciprocate about its own axis as the first tine bar is rotated about its own axis; and
the transmission ratio of the means drivingly coupling the first tine bar to the generally stationary means is such that, for a given angular displacement of the frame member in the one direction aoout the offset axis, the first tine bar is angularly displaced in the opposite direction about its own axis through an angle corresponding to half the given angular displacement of the frame member about the offset axis whereby the packer tines of the second tine bar undergo two different, alternate paths of movement of which one effects packing of crop material within the feeder duct.

20. In a baler according to claim 1, wherein the bale case has a bottom wall in which the inlet opening is formed, wherein the feeder duct has an upper end facing generally upwardly and communicating with the inlet opening in the bale case and a lower end facing generally in a forward direction; and wherein pick-up means are provided adjacent the lower end of the feeder duct for picking up crop material from the ground and delivering it toward the feeder means, and wherein the feeder means comprises a single rotary feeder structure including crop-engaging structure which, in operation, turns through 360° of revolution along a course leading into the feeder duct lower end, rearwardly through the feeder duct and up into the bale case for stuffing an accumulated charge of crop material from the feeder duct lower end into the bale case, and back to the feeder duct lower end for attacking a next accumulated charge of crop material.

21. In a baler according to claim 1 wherein the bale case has a bottom wall in which the inlet opening is formed, wherein the feeder duct has an upper end facing generally upwardly and communicating with the inlet opening in the bale case and a lower end facing generally in a forward direction; and wherein pickup means are provided adjacent the lower end of the feeder duct for picking up crop material from the ground and delivering it toward the feeder means, and wherein the feeder duct is genrally circularly curved in shape with the center of curvature being either co-incident with the offset axis or proximate thereto, and in that, during operation, the sets of tines of the first and second tine bars alternatively move through the feeder duct in the direction from the lower end toward the upper end thereof.

* * * * *